US012468768B2

(12) United States Patent
Tatro (10) Patent No.: US 12,468,768 B2
(45) Date of Patent: Nov. 11, 2025

(54) METHODS AND SYSTEMS FOR CAUSE-BASED FUNDING

(71) Applicant: KindMatch Inc., Cumming, GA (US)

(72) Inventor: Scott Tatro, Cumming, GA (US)

(73) Assignee: Kindmatch, Inc., Ball Ground, GA (US)

( * ) Notice: Subject to any disclaimer, the term of this patent is extended or adjusted under 35 U.S.C. 154(b) by 580 days.

(21) Appl. No.: 15/839,405

(22) Filed: Dec. 12, 2017

(65) Prior Publication Data
US 2018/0165371 A1    Jun. 14, 2018

Related U.S. Application Data

(60) Provisional application No. 62/432,797, filed on Dec. 12, 2016.

(51) Int. Cl.
| | | |
|---|---|---|
| *G06F 16/9535* | (2019.01) | |
| *G06Q 20/20* | (2012.01) | |
| *G06Q 30/0238* | (2023.01) | |
| *G06Q 50/00* | (2024.01) | |

(52) U.S. Cl.
CPC ......... *G06F 16/9535* (2019.01); *G06Q 20/20* (2013.01); *G06Q 30/0238* (2013.01); *G06Q 50/01* (2013.01)

(58) Field of Classification Search
CPC ............... G06Q 20/20; G06Q 30/0238; G06Q 30/0207; G06Q 20/387; G06Q 30/0226; G06Q 50/10; G06Q 30/0279; G06F 16/9535
See application file for complete search history.

(56) References Cited

U.S. PATENT DOCUMENTS

| | | | |
|---|---|---|---|
| 8,090,615 B1 * | 1/2012 | Cunningham | G06Q 30/02 |
| | | | 705/14.27 |
| 8,543,509 B1 * | 9/2013 | Gundy | G06Q 40/00 |
| | | | 705/44 |
| 2004/0034563 A1 * | 2/2004 | Brissette | G07F 7/025 |
| | | | 705/329 |
| 2005/0102154 A1 * | 5/2005 | Dodd | G06Q 30/0279 |
| | | | 705/329 |
| 2008/0172374 A1 * | 7/2008 | Wolosin | G06F 16/9537 |
| 2011/0054986 A1 * | 3/2011 | Rubin | G06Q 50/01 |
| | | | 705/14.2 |
| 2011/0264521 A1 * | 10/2011 | Straka | G06Q 30/02 |
| | | | 705/14.49 |

(Continued)

*Primary Examiner* — Marc S Somers
(74) *Attorney, Agent, or Firm* — Ballard Spahr LLP (57) ABSTRACT

Disclosed are methods and systems for cause-based funding and charity matching. The methods and systems enable charitable match funding based on cause and proximity. An individual and/or a charitable entity such as a nonprofit organization or corporation can pledge a charitable asset (e.g., currency, good, service, etc.) to a charitable cause and/or charitable recipient and have that pledge apportioned to the charitable cause and/or charitable recipient based on a request to apportion the charitable asset or based on redemption of a commercial offer (e.g., coupon, does-count offer) provided by a merchant. An account can be used to manage charitable assets such that they are distributed to a charitable cause and/or charitable recipient at the discretion of the individual and/or the charitable entity.

20 Claims, 4 Drawing Sheets

(56) References Cited

U.S. PATENT DOCUMENTS

| | | | |
|---|---|---|---|
| 2012/0296809 A1* | 11/2012 | Ross | G06Q 30/0226 |
| | | | 705/39 |
| 2013/0103603 A1* | 4/2013 | Merriman | G06Q 30/0279 |
| | | | 705/329 |
| 2013/0191198 A1* | 7/2013 | Carlson | G06F 9/468 |
| | | | 705/14.23 |
| 2013/0311322 A1* | 11/2013 | Potter | G06Q 30/0631 |
| | | | 705/26.7 |
| 2014/0358754 A1* | 12/2014 | Breeden | G06Q 30/018 |
| | | | 705/35 |
| 2014/0365285 A1* | 12/2014 | Bahna | G06Q 30/0633 |
| | | | 705/26.8 |
| 2017/0358014 A1* | 12/2017 | Jensen | G06Q 20/02 |

* cited by examiner

METHODS AND SYSTEMS FOR CAUSE-BASED FUNDING

CROSS REFERENCE TO RELATED PATENT APPLICATION

This application claims priority to U.S. Provisional Application No. 62,432,797 filed Dec. 12, 2016, herein incorporated by reference in its entirety.

BACKGROUND

Individuals, non-profit organizations, corporations, and philanthropic sources have difficulty identifying other individuals, other non-profit organizations, other corporations, and other philanthropic sources that share a similar charitable interest or participate in similar charitable activities. It can be even more difficult for individuals, non-profit organizations, corporations, and philanthropic sources to find others that share a similar charitable interest and are within a proximity to the individuals, non-profit organizations, corporations, and philanthropic sources. Thus, is difficult to provide charity (e.g., currency, goods, services, etc.) to those in need. These and other shortcomings and overcome by the method and systems disclosed herein.

SUMMARY

It is to be understood that both the following general description and the following detailed description are exemplary and explanatory only and are not restrictive. Provided are methods and systems for cause-based funding and charity matching. Charitable causes can be funded through a network consisting of charitable entities (e.g., nonprofit entities, nonprofit organizations, for-profit entities, foundations, corporations, etc.) associated with cause-based (e.g., charitable activity) criteria, along with individuals and businesses that support the charitable entities. The individuals and/or charitable entities can contribute charitable assets (e.g., currency, goods, services, etc.), via the network, that are matched by other individuals and/or charitable entities. The charitable assets can be matched based on geo-location. The matched charitable assets can be distributed to one or more charitable recipients. For example, an individual, based on a charitable interest (e.g., love for dogs, desire to help the homeless, etc.) can pledge a charitable asset (e.g., currency, good, service, etc.) to a charitable activity (e.g., dog rescue, fundraising to support the homeless, etc.), and/or charitable recipient. Geo-location and criteria associated with charity can be used to identify another individual or charitable entity with a similar charitable interest. The other individual and/or charitable entity can be notified (e.g., text message, email, application alert, social media post, etc.) of an opportunity to match the pledge of the charitable asset. The charitable asset and/or the matched charitable assets can be provided to the charitable activity and/or the charitable recipient.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Note that in various instances this detailed disclosure may refer to a given entity performing some action. It should be understood that this language may in some cases mean that a system (e.g., a computer) owned and/or controlled by the given entity is actually performing the action.

The present disclosure relates to methods and systems for cause-based funding and charity matching. Charitable causes can be funded through a network (e.g., charity network, fundraising network, social network, etc.) consisting of charitable entities (e.g., nonprofit entities, nonprofit organizations, for-profit entities, foundations, corporations, etc.) associated with cause-based (e.g., charitable activity) criteria, individuals (e.g., users) that support the charitable entities, and businesses (e.g., merchants) associated with (e.g., in proximity to) the individuals. The charitable entities can contribute (e.g., pledge) charitable assets (e.g., currency, goods, services, etc.), via the network, that are matched (e.g., paired, duplicated, paired in-part, etc.) by various contributors (e.g., users, businesses, etc.) to the network.

Further, the contributors (e.g., users, businesses, etc.) can contribute (e.g., pledge) charitable assets (e.g., currency, goods, services, etc.), via the network, that are matched (e.g., paired, duplicated, paired in-part, etc.) by other contributors (e.g., users, businesses, etc.) to the network. The matched charitable assets can be distributed to one or more charitable recipients. The charitable assets can be matched based on geo-location. For example, a contributor (e.g., users, businesses, etc.), based on a charitable interest (e.g., love for dogs, desire to help the homeless, etc. can pledge a charitable asset (e.g., currency, good, service, etc.) to a charitable activity (e.g., dog rescue, fundraising to support the homeless, etc.), and/or charitable recipient (e.g., distresses dog, homeless individual). Geo-location and criteria associated with charity can be used to identify another contributor with a similar charitable interest (e.g., love for dogs, desire to help the homeless, etc.) as the contributor and in proximity to the contributor. The contributors can be notified (e.g., text message, email, application alert, social media post, etc.), based on the proximity, of an opportunity to match (e.g., pair, duplicate, pair in-part, etc.) the pledge of the charitable asset. The charitable asset and/or the matched charitable assets can be distributed/provided to the charitable activity and/or the charitable recipient.

Additionally, users can be associated with one or more charitable entities. The users, based on the association with the one or more charitable entities, can provide routine contributions (e.g., donations) of charitable assets to the charitable entities. For example, the user can be associated with a user profile that details information relating to the user's charitable interest. The user can be associated with the one or more charitable entities that share a similar charitable interest. The association can allow the user to provide charitable assets to a charitable transaction manager. For example, the association can allow the user to provide monetary donations to a charitable transaction manager. The charitable transaction manager can associate the charitable assets to the user profile/account. The user can select and/or chose how, when, and why the charitable assets are provided to the one or more charitable entities. For example, the user can routinely provide a fund of $50.00 to a user profile/account, and the fund(s) can accrue and/or be distributed to the one or more charitable entities based on user preference. The fund(s) can be direct transactions from a pay source (e.g., electronic pay source, bank account, etc.) defined by the user and associated with the user profile/account. Additionally, the fund(s) can also be transacted through third parties (e.g., PayPal®) associated with the user profile/account.

Additionally, businesses/commercial entities (e.g., merchants) associated with and/or in communication with the network (e.g., charity network, fundraising network, social network, etc.) can promote charitable incentives/offers/deals (e.g., does-count offers) associated with commercial products based on an association with a charitable entity and/or charitable activity. The businesses/commercial entities (e.g., merchants) associated with and/or in communication with the network can promote the charitable incentives/offers/deals by transmitting information associated with the charitable incentives/offers/deals to the charitable transaction manager. The charitable transaction manager can notify (e.g., text, email, application alert, social media post, etc.) users in proximity to the businesses/commercial entities (e.g., merchants) based on geo-location. Alternatively, the users can search for and/or identify the businesses promoting the charitable incentives/offers/deals based on search criteria associated with charity and/or geo-location.

Redemption of the charitable incentives/offers/deals (e.g., does-count offers) can cause at least a portion of a charitable asset (e.g., currency, goods, services, etc.) to be allocated to a charitable recipient associated with the charitable entity and/or charitable activity. For example, the offer/deal (e.g., does-count offer) can refer to a commercial coupon or promotional type of product and/or service offer traditionally associated with a consumer savings incentive. A business can provide a "does-count offer" to users/commercial patrons based on an association with a charitable entity and/or charitable activity. For example, as a charitable incentive to users, a business can allocate a portion (e.g., 30%) of a purchase price of a commercial product supported by the business to a charitable entity and/or charitable recipient. As such, a portion of funds collected by the business based on retail sales of the commercial product can be provided to a charitable entity and/or recipient. The "does-count" offer can provide a charitable incentive for a user to redeem the does-count offer at a point-of-sale device associated with the business in order to support a charitable entity and/or charitable recipient of interest to the user.

Figure 1:
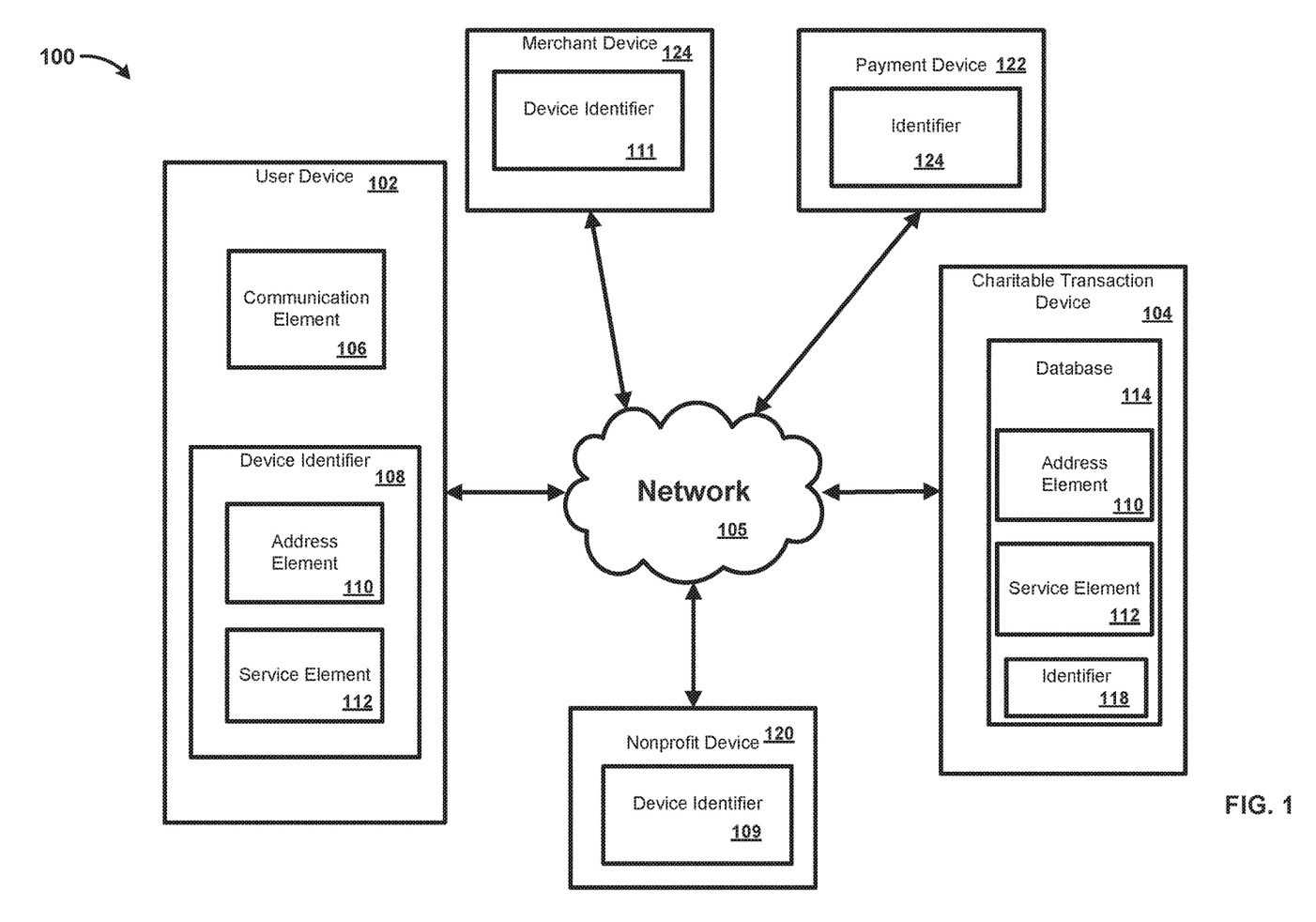
FIG. 1 is a block diagram of an exemplary system and network.

In one aspect of the disclosure, a system can be configured to provide services such as cause-based funding and charity matching. FIG. 1 illustrates various aspects of an exemplary environment in which the present methods and systems can operate. The present disclosure is relevant to systems and methods for providing services to a device, such as a user device, mobile device, smartphone, computer, tablet, communications terminal, or the like. In an aspect, one or more network devices can be configured to provide various services to one or more devices, such as devices located at or near a premises. In another aspect, the network devices can be configured to recognize an authoritative device for the premises and/or a particular service or services available at the premises. As an example, an authoritative device can be configured to govern or enable connectivity to a network such as the Internet or other remote resources, provide address and/or configuration services like DHCP, and/or provide naming or service discovery services for a premises, or a combination thereof. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

A system 100 can comprise a network 105 with multiple devices in communication via the network 105. The network 105 can comprise one or more networks, such as a wide area network (e.g., a fundraising network, social network, charity network, provider network, the Internet), a public network, an open network, a provider managed network, a non-user managed network, a provider controlled network, a non-user controlled network, a local area network, a private network, a closed network, a user managed network, a user controlled network, a user deployed network, and/or the like. Other forms of communications can be used, such as wired and wireless telecommunication channels, for example.

The system 100 can comprise a user device 102 in communication with a charitable transaction device 104 such as a server, for example. Additionally, the user device 102 can be in communication with other devices (e.g., merchant device 116, nonprofit device 120, payment device 122, and other user devices). The devices (e.g., charitable transaction device 104, merchant device 116, nonprofit device 120, payment device 122, and other user devices) can be disposed locally or remotely relative to the user device 102. As an example, the user device 102 and the charitable transaction device 104 can be in communication via a private and/or public network (e.g., network 105) such as the Internet or a local area network. Other forms of communications can be used such as wired and wireless telecommunication channels, for example.

The user device 102 can be an electronic device such as a computer, a smartphone, a laptop, a tablet, a set top box, a display device, or other device capable of communicating with the charitable transaction device 104. As an example, the user device 102 can comprise a communication element 106 for providing an interface for a user to interact with the user device 102 and/or other devices, such as charitable transaction device 104. An example interface can be a communication interface such as a graphical user interface (GUI), application, and/or web browser (e.g., Internet Explorer®, Mozilla Firefox®, Google Chrome®, Safari®, or the like). Other software, hardware, and/or interfaces can be used to provide communication between the user and one or more of the user device 102 and the charitable transaction device 104. The communication element 106 can be an interface for presenting and/or receiving information to/from the user, such as user selection and feedback associated with a charitable entity (e.g., nonprofit entity, non-profit organization, for-profit entity, foundations, corporations, etc.), charitable activity (e.g., philanthropic activity, activity that benefits a community, etc.), charitable interest (e.g., social cause), charitable recipient (e.g., charity beneficiary) and/or associated with user submission (e.g., a pledge) and/or retrieval (e.g., redemption) of a charitable asset (e.g., currency, goods, service, etc.). For example, the communication element 106 can allow the user to define categories associated with a charitable interest, such as a charitable recipient to receive a charitable asset, and transmit information associated with the charitable interest to a charitable transaction device 104 in communication with other devices such as the payment device 122, the merchant device 116, and the nonprofit device 120. As an example, the communication element 106 can request or query various files from a local source and/or a remote source. As a further example, the communication element 106 can transmit data to a local or remote device such as the charitable transaction device 104, the merchant device 116, the nonprofit device 120, and the payment device 122. For example, the communication element 106 can transmit information associated with a charitable asset, such as a pledge of currency to be associated with a charitable activity, to the charitable transaction device 104.

The user device 102 can be associated with a user identifier or device identifier 108. As an example, the device identifier 108 can be any identifier, token, character, string, or the like, for differentiating one user or user device (e.g., user device 102) from another user or user device. In a further aspect, the device identifier 108 can identify a user or user device as belonging to a particular class of users or user devices. As a further example, the device identifier 108 can comprise information relating to the user device such as a manufacturer, a model or type of device, a service provider associated with the user device 102, a state of the user device 102, a locator (e.g., geo-locator), and/or a label or classifier. Other information can be represented by the device identifier 108.

The device identifier 108 can comprise an address element 110 and a service element 112. In an aspect, the address element 110 can comprise or provide an internet protocol address, a network address, a media access control (MAC) address, an Internet address, or the like. As an example, the address element 110 can be relied upon to establish a communication session between the user device 102 and the charitable transaction device 104, the merchant device 116, the nonprofit device 120, the payment device 122, other user devices (e.g., user device 102), and other devices and/or networks. As a further example, the address element 110 can be used as an identifier or locator of the user device 102. In an aspect, the address element 110 can be persistent for a particular network.

The service element 112 can comprise an identification of a service provider associated with the user device 102 and/or with the class of user device 102. The class of the user device 102 can be related to a type of device, capability of device, type of service being provided, and/or a level of service (e.g., business class, service tier, service package, etc.). As an example, the service element 112 can comprise information relating to or provided by a communication service provider (e.g., Internet service provider) that is providing or enabling data flow such as communication services to the user device 102. As a further example, the service element 112 can comprise information relating to a preferred service provider for one or more particular services relating to the user device 102. In an aspect, the address element 110 can be used to identify or retrieve data from the service element 112, or vice versa. As a further example, one or more of the address element 110 and the service element 112 can be stored remotely from the user device 102 and retrieved by one or more devices such as the user device 102 and the charitable transaction device 104. Other information can be represented by the service element 112.

The charitable transaction device 104 can be a device, such as a server, for communicating with devices such as the user device 102, the merchant device 116, the nonprofit device 120, and the payment device 122. For example, the charitable transaction device 104 can communicate with the user device 102, the merchant device 116, the nonprofit device 120, and/or the payment device 122 to manage cause-based funding of charitable activities. The charitable transaction device 104 can provide services such as associating devices with other devices. For example, the charitable transaction device 104 can associate the user device 102 with another user device (e.g., user device 102), the merchant device 116, the nonprofit device 120, and/or the payment device 122. The charitable transaction device 104 can associate devices based on a charitable entity, charitable interest, charitable activity, charitable asset, charitable recipient, combinations thereof and the like associated with the devices. Additionally, the charitable transaction device 104 can provide services such as network (e.g., Internet) connectivity, network printing, media management (e.g., media server), fundraising management services, streaming services, broadband services, communication/messaging services, or other network-related services. For example, the charitable transaction device 104 can manage messages associated with cause-based funding (e.g., charity, fundraising, etc.) via a variety of communication mediums such as text messages, emails, social media post, and application alerts, for example. The charitable transaction device 104 can manage messages between devices based on an association with a profile/account (e.g., user account, nonprofit account, merchant account) and a charitable entity (e.g., nonprofit entity, nonprofit organization, for-profit entity, foundations, corporations, user device 102, merchant device 116, nonprofit device 120, etc.). For example, the charitable transaction device 104 can manage messages between user devices (e.g., user device 102) associated with users wanting to make a donation of a charitable asset to a charitable entity (e.g., nonprofit device 120), charitable activity, and/or charitable recipient.

In an aspect, the charitable transaction device 104 can allow devices such as user device 102 to interact with remote resources such as data, devices, and files. As an example, the charitable transaction device can be configured as (or disposed at) a central location (e.g., processing facility), which can receive content (e.g., data, input programming) from multiple sources. The charitable transaction device 104 can combine the content from the multiple sources and can distribute the content to user (e.g., subscriber) locations via a distribution system (e.g., charitable funds distribution system). For example, the charitable transaction device 104 can combine charitable assets e.g., currency, goods, services) and/or information associated with charitable assets from the multiple sources and can distribute the charitable assets and/or information associated with the charitable asset to user devices (e.g., user device 102) and/or charitable entities (e.g., merchant device 116, nonprofit device 120, etc.) via a distribution system (e.g., cause-based funding distribution system, charity distribution system, social network, etc.).

In an aspect, the charitable transaction device 104 can manage the communication between the user device 102, the merchant device 116, the nonprofit device 120, and/or the payment device 122 and a database 114 for sending and receiving data therebetween. As an example, the database 114 can store a plurality of profiles, (e.g., user profiles, merchant profiles, nonprofit organization profiles, fundraising profiles, files (e.g., web pages), user identifiers or records, or other information. As a further example, devices such as the user device 102, the merchant device 116, the nonprofit device 120, and/or the payment device 122 can request and/or retrieve a file from the database 114. In an aspect, the database 114 can store information relating to devices such as the user device 102, the merchant device 116, the nonprofit device 120, and/or the payment device 122 such as the address element 110, the service element 112, an identifier 118, an identifier 122, an identifier 124, and the like. As an example, the charitable transaction device 104 can obtain the device identifier 108 from the user device 102 and retrieve information from the database 114 such as a user profile (e.g., user account), the address element 110 and/or the service elements 112. As a further example, the charitable transaction device 104 can obtain the address element 110 from the user device 102 and can retrieve the service element 112 from the database 114, or vice versa. Any information can be stored in and retrieved from the database 114. The database 114 can be disposed remotely from the charitable transaction device 104 and accessed via direct or indirect connection. The database 114 can be integrated with the charitable transaction device 104 or some other device or system.

The system 100 can comprise the nonprofit device 120. The nonprofit device 120 can be associated with a charitable entity. The nonprofit device 120 can be associated with an entities (e.g., charitable entities) such as a qualified IRS 501(c)(3) organizations, public charities described in Internal Revenue Code Section 509, or agencies which operate for the public good (e.g., disaster relief, homeless shelters, support groups, etc.). For example, the nonprofit device 120 can be associated with charitable entities such as the American Civil Liberties Union (ACLU), American Red Cross, Feeding America, Samaritan's Purse, and/or the like.

The nonprofit device 120 can be a device, such as a server, for communicating with devices such as the user device 102, the charitable transaction device 104, the merchant device 116, and the payment device 122. The nonprofit device 120 can communicate with the user device 102, the charitable transaction device 104, the merchant device 116, and/or the payment device 122 based on cause-based funding or charitable activities. The nonprofit device 120 can communicate with the user device 102, the charitable transaction device 104, the merchant device 116, and/or the payment device 122 to provide information about and/or related to charitable activities associated with the nonprofit device 120/charitable entity. For example, a charitable entity such as American Red Cross can use the nonprofit device 120 to provide incremental updates regarding and/or relating to blood drives, charitable partnerships, mission-related activities, and the like.

Additionally, the nonprofit device 120 can communicate with the user device 102, the charitable transaction device 104, the merchant device 116, and the payment device 122 to contribute and/or partake in cause-based funding. For example, charitable entities associated with the nonprofit device 120 can contribute (e.g., pledge) charitable assets (e.g., currency, goods, services, etc.), via the network 105, that are matched (e.g., paired, duplicated, paired in-part, etc.) by various contributors (e.g., users, businesses, etc.) to the network 105. The charitable entities associated with the nonprofit device 120 can receive contributions (e.g., pledges) of charitable assets (e.g., currency, goods, services, etc.), via the network 105. The contributions (e.g., pledges) of the charitable assets (e.g., currency, goods, services, etc.) can be matched (e.g., paired, duplicated, paired in-part, etc.) by the charitable entities. The charitable assets can be matched based on geo-location. For example, a contributor (e.g., users, businesses, etc.), based on a charitable interest (e.g., love for dogs, desire to help the homeless, etc.) can pledge a charitable asset (e.g., currency, good, service, etc.) to a charitable activity (e.g., dog rescue, fundraising to support the homeless, etc.) associated with the charitable entity/nonprofit device 120. Geo-location and criteria associated with charity can be used to identify the charitable entity/nonprofit device 120.

Geo-location and criteria associated with charity can be used to identify the charitable entity/nonprofit device 120 based on an identifier associated with the charitable entity/nonprofit device 120. The nonprofit device 120 can be associated with a nonprofit identifier or device identifier 109. As an example, the device identifier 109 can be any identifier, token, character, string, or the like, for differentiating one charitable entity/nonprofit device (e.g., nonprofit device 120) from another charitable entity/nonprofit device. In a further aspect, the device identifier 109 can identify a charitable entity/nonprofit device as belonging to a particular class of charitable entities/nonprofit devices. As a further example, the device identifier 109 can comprise information relating a state of the nonprofit device 120, a locator (e.g., geo-locator), and/or a label or classifier. The device identifier 109 can be used as an identifier or locator of nonprofit device 120. Other information can be represented by the device identifier 109.

The system 100 can comprise the merchant device 124. The merchant device 124 can be associated with a business and/or commercial entity (e.g., Pizza Hut®, Target®, etc.). The merchant device 124 can be a device, such as a server, for communicating with devices such as the user device 102, the charitable transaction device 104, the nonprofit device 120, and the payment device 122. The merchant device 124 can communicate with the user device 102, the charitable transaction device 104, the nonprofit device 120, and/or the payment device 122 based on cause-based funding or charitable activities. The merchant device 124 can communicate with the user device 102, the charitable transaction device 104, the nonprofit device 120, and/or the payment device 122 to provide/promote information about charitable incentives/offers/deals (e.g., does-count offers) associated with commercial products based on an association with a charitable entity (e.g., nonprofit device 120) and/or charitable activity. Information about the charitable incentives/offers/deals can comprise an offer type (e.g., product price discount offer, product purchase and matching offer, buy one get one free offer etc.) a specific value of the offer, rules associated with the offer (e.g., restrictions on a number of users/charitable entities able to redeem the offer), dates/times associated with the offer, and the like.

The business and/or commercial entity associated with the merchant device 124 can promote the charitable incentives/offers/deals by transmitting information associated with the charitable incentives/offers/deals to the charitable transaction device 104. The charitable transaction device 104 can notify (e.g., text, email, application alert, social media post, etc.) users in proximity to business and/or commercial entity associated with the merchant device 124 based on geo-location. Alternatively, users (e.g., user device 102) can search for and/or identify the business and/or commercial entity associated with the merchant device 124 promoting the charitable incentives/offers/deals based on search criteria associated with charity and/or geo-location. Redemption of the charitable incentives/offers/deals (e.g., does-count offers) can cause at least a portion of a charitable asset (e.g., currency, goods, services, etc.) to be allocated to a charitable recipient associated with the charitable entity and/or charitable activity. For example, the offer/deal (e.g., does-count offer) can refer to a commercial coupon or promotional type of product and/or service offer traditionally associated with a consumer savings incentive. A business can provide a "does-count offer" to users/commercial patrons based on an association with a charitable entity and/or charitable activity. For example, as a charitable incentive to users, a business can allocate a portion (e.g., 30%) of a purchase price of a commercial product supported by the business to a charitable entity and/or charitable recipient. As such, a portion of funds collected by the business based on retail sales of the commercial product can be provided to a charitable entity and/or recipient. The "does-count" offer can provide a charitable incentive for a user to redeem the does-count offer at a point-of-sale device associated with the business in order to support a charitable entity and/or charitable recipient of interest to the user. Information associated with redemption of a charitable incentive/offer/deal (e.g., does-count offer) can be provided to the charitable transaction device 104 (or another device) for tracking, monitoring, and the like. For example, information associated with redemption of a charitable incentive/offer/deal (e.g., does-count offer) can be provided to the charitable transaction device 104 (or another device) and stored in a profile (e.g., user profile).

The business and/or commercial entity associated with the merchant device 124 can be searched for and/or identified based on geo-location and/or search criteria associated with charity. Geo-location and search criteria associated with charity can be used to identify the charitable entity/nonprofit device 120 based on an identifier associated with the merchant device 124. The merchant device 124 can be associated with a merchant identifier or device identifier 111. As an example, the device identifier 111 can be any identifier, token, character, string, or the like, for differentiating one business/commercial entity/merchant device (e.g., merchant device 124) from another business/commercial entity/merchant device. In a further aspect, the device identifier 111 can identify a business/commercial entity/merchant device as belonging to a particular class of business/commercial entity/merchant devices. As a further example, the device identifier 111 can comprise information relating a state of the merchant device 124, a locator (e.g., geo-locator), and/or a label or classifier. The device identifier 111 can be used as an identifier or locator of the merchant device 124. Other information can be represented by the device identifier 111.

To process an charitable incentive/offer/deal (e.g., does-count offer), the merchant device 124 can comprise a charitable transaction device, a wireless communication device, a point of sale terminal (POS), a gas pump terminal, a credit card processing device, or any other device capable of communicating with the cause-based funding network (e.g., network 105) to process an exchange (e.g., commercial transaction) associated with a charitable incentive/offer/deal. The merchant device 124 can be configured to process the exchange between the business/commercial entity and users/contributors (e.g., user device 102) to the cause-based funding network (e.g., network 105). The merchant device 124 can be configured to receive identifiers (e.g., user identifiers, device identifier 108) and/or the like to process an exchange (e.g., charitable transaction) associated with a charitable incentive (e.g., does-count offer). The merchant device 124 can be in communication with a the payment device 122 based on the charitable incentive/offer/deal. The merchant device 124 can request the payment device 122 to authorize, process, complete, and/or the like, the exchange associated with the does-count offer.

The system 100 can comprise a payment device 122. The payment device 122 can comprise a device supporting a cause-based funding network (e.g., network 105). For example, the cause-based funding network (e.g., network 105) can comprise a system or network used for the transfer of charitable assets. The payment device 122 can be managed by a third-party intermediary. The payment device 122 can be configured to authorize, process, complete, and/or the like an exchange (e.g., charitable transaction) associated with a charitable incentive (e.g., does-count offer). For example, a user (e.g., user device 102) redeeming a charitable incentive (e.g., does-count offer) provided by a business/commercial entity (e.g., merchant device 124) can submit a payment (e.g., performs a commercial transaction) associated with the charitable incentive (e.g., does-count offer) using an eligible payment product (e.g., cash, credit card, charitable membership card, charitable asset, etc.) at a merchant device 124. For example, a credit card can be swiped through a card reading device (e.g., POS, merchant device 124) to provide payment for a commercial transaction associated with a charitable incentive (e.g., does-count offer). When the credit card is swiped through the card reading device, the card reading device can transmit an authorization request to the payment device 122. As such, the payment device 122 can operate as a third party processor and be configured to determine whether a current exchange is authorized and/or completed. Information relating to the exchange can be transmitted to the charitable transaction device 104. An authorization request can comprise a request for payment authorization of the commercial transaction. The request for payment authorization can comprise financial services information, description information, date information, time information, and payment information. The payment device 122 can be configured to receive and process the authorization requests. For example, the request can comprise a user identifier (e.g., device identifier 108), merchant identifier (e.g., device identifier 111), nonprofit identifier (e.g., device identifier 109), a product identifier, an identifier associated with an account (e.g., user account, merchant account, nonprofit account, etc.), and/or the like. The payment device 122 can associate the payment product (e.g., cash, credit card, charitable membership card, charitable asset, etc.) to an authorized account (e.g., user account, merchant account, nonprofit account, etc.) based on the user identifier (e.g., device identifier 108), merchant identifier (e.g., device identifier 111), nonprofit identifier (e.g., device identifier 109), a product identifier, an identifier associated with an account (e.g., user account, merchant account, nonprofit account, etc.), and/or the like. Authorization request can be received by the payment device 122 and processed in real time.

Additionally, the payment device 122 can be configured to receive and process requests from devices, such as the user device 102 and/or the nonprofit device 120 for charity matching. For example, devices (e.g., user device 102, nonprofit device 120, merchant device 124, etc. can contribute (e.g., pledge) charitable assets (e.g., currency, goods, services, etc.), via a cause-based funding network (e.g., network 105) to the payment device 122 for authorization. The payment device 122 can authorize the contributions by communicating with the charitable transaction device 104 and verifying a profile/account (e.g., user account, nonprofit account, merchant account, etc.) stored in a database (e.g., database 114).

Figure 2:
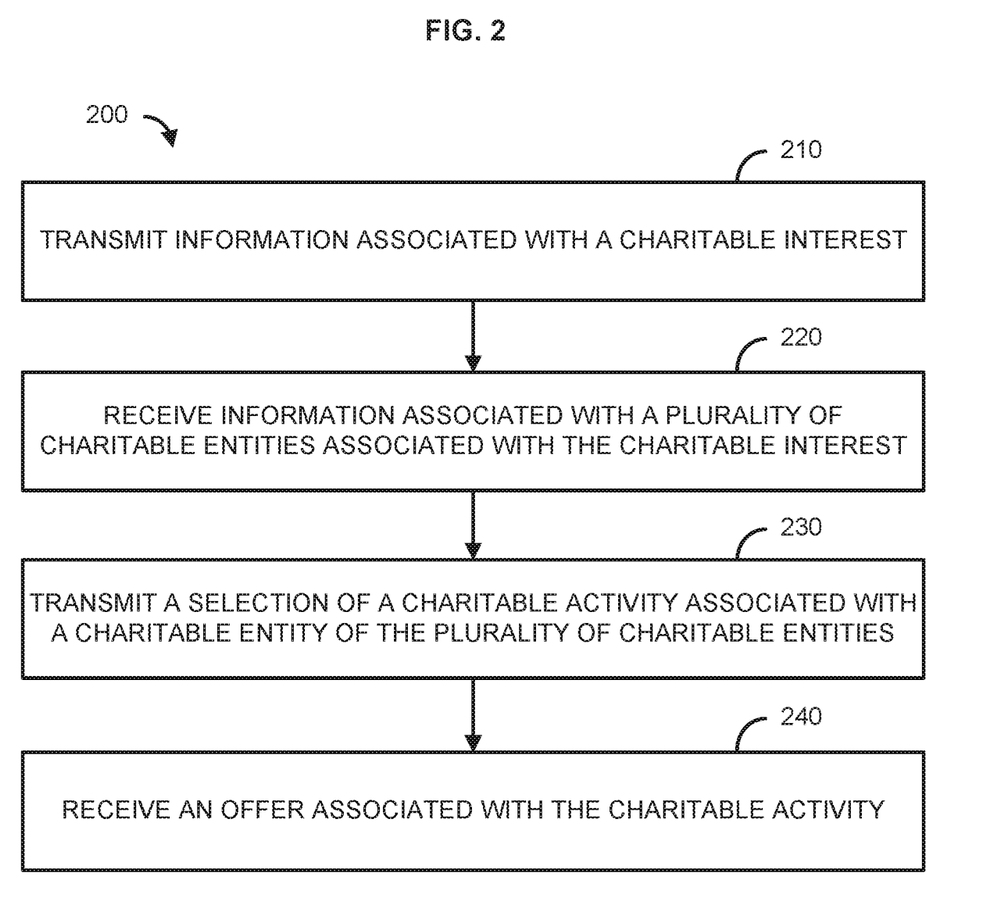
FIG. 2 is a flow chart of an exemplary method.

FIG. 2 is a flowchart illustrating an example method 200. At 210, a user device (e.g., user device 102) can transmit information associated with a charitable interest social cause). The user device can be a mobile device, smartphone, computer, tablet, communications terminal, or the like. The information associated with a charitable interest can be based on a selection of a charitable interest. For example, an interface associated with the user device can be configured to receive input based on a selection of a charitable interest. The interface associated with the user device can be a graphical user interface (GUI), application, and/or web browser (e.g., Internet Explorer®, Mozilla Firefox®, Google Chrome®, Safari®, or the like). For example, a user can use a GUI and/or application configured on the user device to provide/input information such as the user's interest in a charitable interest (social cause, love for dog, desire to help the homeless, etc.). The information associated with the charitable interest can be transmitted to a network device (e.g., charitable transaction device 104) in communication with a cause-based funding network (e.g. network 105, Internet, social network, etc.).

At 220, in response to transmitting the information associated with the charitable interest, the user device (e.g., user device 102) can receive information associated with a plurality of charitable entities (e.g., nonprofit entities, nonprofit organizations, for-profit entities, foundations, corporations, etc.) associated with the charitable interest. The plurality of charitable entities can be within a proximity to the user device. The plurality of charitable entities can be determined to be within a proximity to the user device based on geo-location. For example, the network device (e.g., charitable transaction device 104) can use an identifier associated with the user device (e.g., device identifier 108) to determine a location of the user device transmitting the information associated with the charitable interest. Further, the network device (e.g., charitable transaction device 104) can use identifiers associated with charitable entities (e.g., device identifier 108, device identifier 109, device identifier 111) to determine locations of the plurality of charitable entities, among the charitable entities, that are within proximity (e.g., close proximity, based on a proximity setting/information, etc.) to the user device. As such, the information associated with the plurality of charitable entities can comprise locations of the plurality of charitable entities within a proximity (e.g., close proximity) to the user device.

At 230, based on the information associated with the plurality of charitable entities, the user device can transmit a selection of a charitable activity (e.g., dog rescue, fundraising to support the homeless, etc.) of one or more charitable activities associated with a charitable entity (e.g., nonprofit entities, nonprofit organizations, for-profit entities, foundations, corporations, etc.) of the plurality of charitable entities. For example, the interface associated with the user device can be configured to receive input based on a selection of a charitable activity. For example, the graphical user interface (GUI), the application, and/or the web browser (e.g., Internet Explorer®, Mozilla Firefox®, Google Chrome®, Safari®, or the like) associated with the user device can be used to select a charitable activity, such as a dog rescue event, that they would like to provide charitable assistance to. The charitable activity can be associated with the plurality of charitable entities in proximity to the user device. The charitable assistance (e.g., charitable asset) can be provided to a charitable recipient (e.g., a donee).

At 240, the user device can receive an offer (e.g., a does-count offer) associated with the charitable activity. The user device can receive the offer in response to transmitting the selection of the charitable activity. The offer can refer to a commercial coupon or promotional type of product and/or service offer associated with a consumer savings incentive. For example, a merchant, business, commercial entity, and the like can provide a "does-count offer" to users/commercial patrons based on an association with a charitable entity and/or charitable activity. For example, as a charitable incentive to users, a merchant can allocate a portion (e.g., 30%) of a purchase price of a commercial product supported by the merchant to a charitable entity and/or charitable recipient. As such, a portion of funds collected by the merchant based on retail sales of the commercial product can be provided to a charitable entity (e.g., a non-profit organization) and/or charitable recipient (e.g., a donee, etc.). For example, the offer can provide a charitable incentive for a user to redeem the offer at a point-of-sale device associated with the merchant in order to support a charitable entity and/or charitable recipient of interest to the user.

Redemption of the offer can cause at least a portion of a charitable asset (e.g., currency, goods, services, etc.) to be allocated to a charitable recipient associated with the charitable entity and/or charitable activity. Additionally, redemption of the offer can allocate at least a portion of the charitable asset to an account associated with the user device and/or the user of the user device. For example, redemption of the offer can allocate a percentage (e.g., 10 percent) of a purchase price of a commercial product supported by the merchant to an account. The account can comprise and/or be associated with a plurality of charitable assets. Charitable assets in/associated with the account can distributed to one or more charitable recipients. For example, the user can use the user device the GUI, the application, the web browser, etc.) to select/determine the one or more charitable recipients from a plurality of charitable recipients. The user/user device, based on the selection/determination of the one or more charitable recipients can cause at least a portion of the charitable assets in/associated with the account to be transmitted to the one or more charitable recipients.

Figure 3:
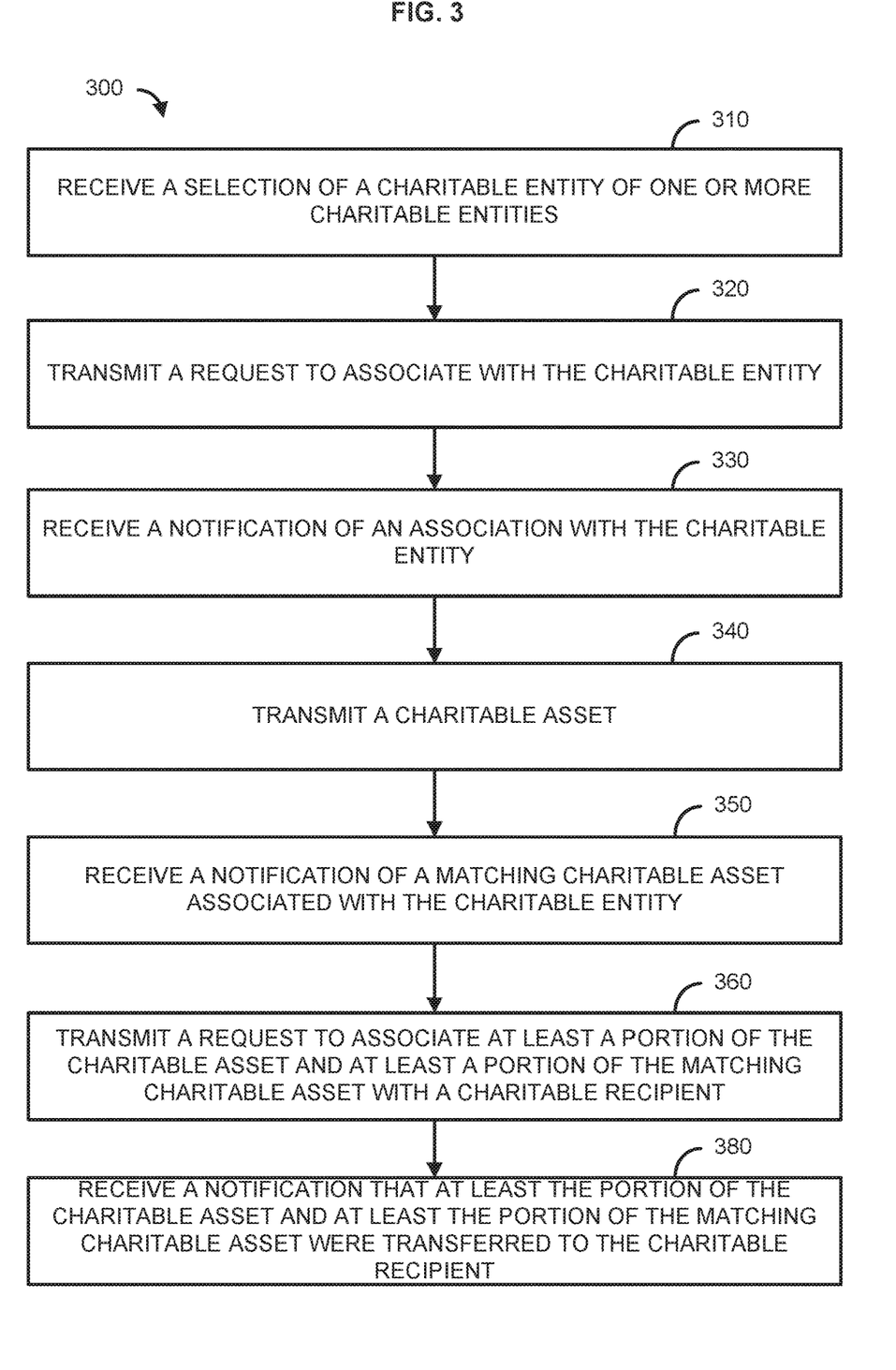
FIG. 3 is a flow chart of an exemplary method.

FIG. 3 is a flowchart illustrating an example method 300. At 310, a user device (e.g., user device 102) can receive a selection of a charitable entity of one or more charitable entities (e.g., the non-profit device 120, the merchant device 124, etc.). The user device can be a mobile device, smartphone, computer, tablet, communications terminal, or the like. The one or more charitable entities can be nonprofit entities, nonprofit organizations, for-profit entities, foundations, corporations, merchants, and the like. The selection of the charitable entity can be received via a user interface such as a graphical user interface (GUI), an application, a web browser, and the like configured in association with the user device. For example, the user device can be configured with a map-based interface that enables a user to identify one or more geographic regions and select, based on cause-based criteria (e.g., charitable interest, charitable activity, etc.) a charitable entity of one or more charitable entities.

At 320, the user device can transmit a request to associate with the charitable entity. For example, the user device can transmit a request to associate with the charitable entity to a network device (e.g., charitable transaction device 104). The network device can be in communication with one or more charitable entities (e.g., the non-profit device 120, the merchant device 124, etc.). For example, the network device can be in communication with one or more nonprofit entities, nonprofit organizations, for-profit entities, foundations, corporations, merchants, and the like. The network device, based on the request to associate with the charitable entity can associate an account (e.g., user account) associated with the user device with an account associated with the charitable entity.

At 330, the user device can receive a notification (e.g., an email, a text message, a social media post, an application alert, etc.) of an association with the charitable entity. The user device can receive a notification of the association with the charitable entity from the network device and/or the charitable entity. The notification of the association with the charitable entity can be an email, a text message, a social media post, an application alert, and a combination thereof that informs the user device of the with the charitable entity. For example, in response to transmitting the request to associate with the charitable entity, the user device can receive a text message from the network device informing the user device that it has been "matched" with a charitable entity such as the American Red Cross, Wal-Mart®, or another user.

At 340, the user device can transmit a charitable asset. The user device can transmit the charitable asset in response to receiving the notification (e.g., email, text message, social media post, application alert, etc.) of the association with the charitable entity. The user device can transmit the charitable asset to an account associated with the user and/or the charitable entity. The charitable asset can be retained in and/or in association with the account. For example, the user/user device can transmit/transfer cash (e.g., $50) to the account. The charitable asset can be retained in and/or in association with the account until it is distributed/transmitted to a charitable recipient.

At 350, in response to transmitting the charitable asset (e.g., $50), the user device can receive a notification of a matching charitable asset. The matching charitable asset can be associated with the charitable entity. For example, the charitable entity can receive a notification (e.g., an email, a text message, a social media post, an application alert, etc.) that the user device transmitted the charitable asset (e.g., $50) to the account. The charitable entity, based on the notification that the user device transmitted the charitable asset (e.g., $50) to the account, can transmit a matching charitable asset (e.g., $50) to the account. The user device can receive a notification (e.g., an email, a text message, a social media post, an application alert, etc.) of the matching charitable asset.

At 360, the user device can transmit a request to associate at least a portion of the charitable asset (e.g., $50) and at least a portion of the matching charitable asset (e.g., $50) with a charitable recipient of one or more charitable recipients. The user device can transmit the request to associate at least a portion of the charitable asset and at least a portion of the matching charitable asset with the charitable recipient to the network device or another device in communication with the network and/or the network device such as a charitable asset management device (e.g., payment device 122).

At 370, the user device can receive a notification (e.g., an email, a text message, a social media post, an application alert, etc.) that at least the portion of the charitable asset and at least the portion of the matching charitable asset were transferred to the charitable recipient. For example, the user device can receive a text message and/or application alert that $20 of the $50 transmitted to the account by the user device and $20 of the matching $50 transmitted to the account by the charitable entity, has been transmitted/transferred to an individual or group supported by the American Red Cross.

Figure 4:
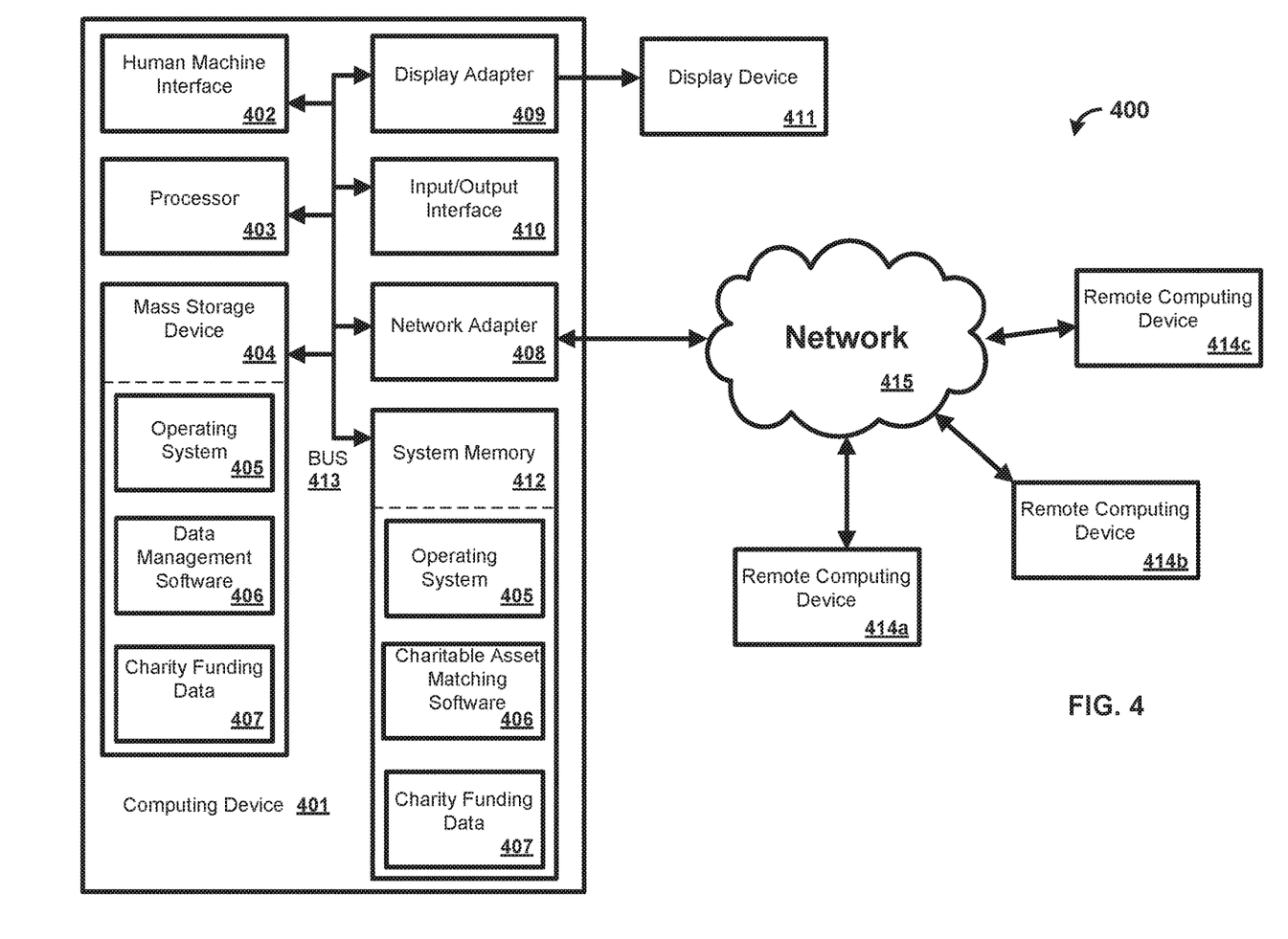
FIG. 4 is a block diagram of an exemplary computing device.

In an exemplary aspect, the methods and systems can be implemented on a computing device 401 as illustrated in FIG. 4 and described below. By way of example, the user device 102, the charitable transaction device 104, the non-profit device 120, the payment device 122, and the merchant device 124 of FIG. 1 can be a computer as illustrated in FIG. 4. Similarly, the methods and systems disclosed can utilize one or more computers to perform one or more functions in one or more locations. FIG. 4 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 101. The components of the computing device 101 can comprise, but are not limited to, one or more processors 403, a system memory 412, and a system bus 413 that couples various system components including the one or more processors 403 to the system memory 412. The system can utilize parallel computing.

The system bus 413 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 413, and all buses specified in this description can also be implemented over a wired or wireless network connection and each of the subsystems, including the one or more processors 403, a mass storage device 404, an operating system 405, charitable asset matching software 406, charity funding data 407, a network adapter 408, the system memory 412, an Input/Output Interface 410, a display adapter 409, a display device 411, and a human machine interface 402, can be contained within one or more remote computing devices 414a,b,c at physically separate locations, connected through buses of this form, in effect implementing a fully distributed system.

The computing device 401 typically comprises a variety of computer readable media. Exemplary readable media can be any available media that is accessible by the computing device 401 and comprises, for example and not meant to be limiting, both volatile and non-volatile media, removable and non-removable media. The system memory 412 comprises computer readable media in the form of volatile memory, such as random access memory (RAM), and/or non-volatile memory, such as read only memory (ROM). The system memory 412 typically contains data such as the charity funding data 407 and/or program modules such as the operating system 405 and the charitable asset matching software 406 that are immediately accessible to and/or are presently operated on by the one or more processors 403.

In another aspect, the computing device 401 can also comprise other removable/non-removable, volatile/non-volatile computer storage media. By way of example, FIG. 4 illustrates the mass storage device 404 which can provide non-volatile storage of computer code, computer readable instructions, data structures, program modules, and other data for the computing device 401. For example and not meant to be limiting, the mass storage device 404 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 404, including by way of example, the operating system 405 and the charitable asset matching software 406. Each of the operating system 405 and the charitable asset matching software 406 (or some combination thereof) can comprise elements of the programming and the charitable asset matching software 406. The charity funding data 407 can also be stored on the mass storage device 404. The charity funding data 407 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 401 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 403 via the human machine interface 402 that is coupled to the system bus 413 but can be connected by other interface and bus structures, such as a parallel port, game port, an IEEE 1394 Port (also known as a Firewire port), a serial port, or a universal serial bus (USB).

In yet another aspect, the display device 411 can also be connected to the system bus 413 via an interface, such as the display adapter 409. It is contemplated that the computing device 401 can have more than one display adapter 409 and the computing device 401 can have more than one display device 411. For example, the display device 411 can be a monitor, an LCD (Liquid Crystal Display), or a projector. In addition to the display device 411, other output peripheral devices can comprise components such as speakers (not shown) and a printer (not shown) which can be connected to the computing device 401 via the Input/Output Interface 410. Any step and/or result of the methods can be output in any form to an output device. Such output can be any form of visual representation, including, but not limited to, textual, graphical, animation, audio, tactile, and the like. The display device 411 and computing device 401 can be part of one device, or separate devices.

The computing device 401 can operate in a networked environment using logical connections to one or more remote computing devices 414*a,b,c*. By way of example, a remote computing device can be a personal computer, portable computer, smartphone, a server, a router, a network computer, a peer device or other common network node, and so on. Logical connections between the computing device 401 and a remote computing device 414*a,b,c* can be made via a network 415, such as a local area network (LAN) and/or a general wide area network (WAN). Such network connections can be through the network adapter 408. The network adapter 408 can be implemented in both wired and wireless environments. Such networking environments are conventional and commonplace in dwellings, offices, enterprise-wide computer networks, intranets, and the Internet.

For purposes of illustration, application programs and other executable program components such as the operating system 405 are illustrated herein as discrete blocks, although it is recognized that such programs and components reside at various times in different storage components of the computing device 401, and are executed by the one or more processors 403 of the computer. An implementation of the charity asset matching software 406 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

The methods and systems can employ Artificial intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
sending, by a user device, via an application of the user device, an identifier associated with the user device and location information of the user device, wherein the identifier is associated with a user profile that indicates one or more charitable interests, wherein the user profile is stored in a database of a charitable transaction device, wherein the charitable transaction device is configured to receive information associated with one or more charitable activities associated with the one or more charitable interests from a merchant device, wherein the charitable transaction device is further configured to receive information associated with one or more charitable activities associated with one or more charitable entities from a nonprofit device, and wherein the charitable transaction device is further configured to distribute information associated with one or more charitable activities associated with one or more preferred charitable entities of a plurality of preferred charitable entities based on one or more user profiles, the information received from the nonprofit device, and one or more user device proximities;
receiving, from the charitable transaction device, based on the identifier, a notification comprising the information associated with the one or more charitable activities associated with the one or more preferred charitable entities of the plurality of preferred charitable entities, wherein the charitable transaction device retrieves the user profile based on the identifier and sends the notification to the user device based on the user profile, wherein the notification comprises an application alert via the application of the user device, and wherein the one or more preferred charitable entities are determined by the charitable transaction device based on:
an association with the one or more charitable interests indicated by the user profile, and
a proximity of the one or more preferred charitable entities to a current location of the user device;
sending, via a user interface of the application of the user device, a selection of a charitable activity of the one or more charitable activities associated with a preferred charitable entity of the one or more preferred charitable entities;
receiving, from the merchant device, based on the selection of the charitable activity, an offer associated with a promotion of one or more products to be purchased by a predetermined number of users during a predetermined time period at the merchant device;
sending, to a payment device associated with the merchant device, based on a utilization of a payment product at the merchant device, a payment authorization request for purchasing at least one product of the one or more products, wherein the payment authorization request comprises financial services information, description information, date information, and payment information associated with a user of the user device, wherein the payment authorization request further comprises a user identifier, a merchant identifier, a nonprofit identifier, a product identifier, and an account identifier, wherein the payment device authorizes the payment authorization request for purchasing the at least one product based on associating the payment product to an authorized account, wherein the payment device associates the payment product to the authorized account based on the user identifier, the merchant identifier, the nonprofit identifier, the product identifier, and the account identifier;
causing, based on the purchase of the at least one product during the predetermined time period by a number of users that does not exceed the predetermined number of users at the merchant device, a first portion of a purchase price of the at least one product to be allocated to a charitable recipient associated with the charitable activity, wherein the purchase device authorizes the allocation of the first portion of the purchase price to the charitable recipient based on verifying the user profile, wherein the first portion is matched by the preferred charitable entity;
causing, based on the purchase of the at least one product during the predetermined time period by the number of users that does not exceed the predetermined number of users at the merchant device, a second portion of the purchase price of the at least one product to be allocated to an account associated with the user device comprising a plurality of charitable assets, wherein the purchase device authorizes the allocation of the second portion of the purchase price to the account associated with the user device based on verifying the user profile;
sending, to the charitable transaction device, information associated with redemption of the offer, wherein the charitable transaction device stores the information associated with the redemption of the offer in the user profile;
selecting, via the user interface of the application of the user device, one or more charitable recipients of a plurality of charitable recipients; and
causing, based on the selection of the one or more charitable recipients, a portion of each charitable asset of the plurality of charitable assets to be sent to the one or more charitable recipients.

2. The method of claim 1, wherein receiving the information associated with the one or more charitable activities comprises:
determining, based on the one or more preferred charitable entities, the information associated with the one or more charitable activities; and
sending, to the user device, the information associated with the one or more charitable activities.

3. The method of claim 1, wherein redemption of the offer at the merchant device comprises validation of a code associated with the preferred charitable entity.

4. The method of claim 1, wherein each charitable asset comprises one or more of: a currency, a good, or a service.

5. The method of claim 1, wherein the merchant device comprises one or more of a point of sale (POS) device, a gas pump terminal, or a credit card processing device.

6. A method comprising:
receiving, by a user device, via an application of the user device, based on an identifier associated with the user device and location information of the user device, information associated with one or more charitable activities associated with one or more preferred charitable entities of a plurality of preferred charitable entities, wherein the identifier is associated with a user profile that indicates one or more charitable interests, wherein the user profile is stored in a database of a charitable transaction device, wherein the charitable transaction device is configured to receive information associated with one or more charitable activities associated with the one or more charitable interests from a merchant device, wherein the charitable transaction device is further configured to receive information associated with one or more charitable activities associated with one or more charitable entities from a nonprofit device, wherein the charitable transaction device is further configured to distribute information associated with one or more charitable activities associated with one or more preferred charitable entities of a plurality of preferred charitable entities based on one or more user profiles, the information received from the nonprofit device, and one or more user device proximities, and wherein the one or more preferred charitable entities are determined by the charitable transaction device based on:
  an association with the one or more charitable interests indicated by the user profile, and
  a proximity of the one or more preferred charitable entities to a current location of the user device;
sending, based on a selection via a user interface of the application of the user device of a charitable activity of the one or more charitable activities, a request to associate with a preferred charitable entity of the one or more preferred charitable entities;
sending, based on a transaction associated with the charitable activity at the merchant device at a location of the preferred charitable entity, a charitable asset;
receiving, based on the charitable asset, a notification of a matching charitable asset associated with the preferred charitable entity, wherein the notification of the matching charitable asset associated with the preferred charitable entity comprises an application alert via the application of the user device;
sending a request to associate the charitable asset and the matching charitable asset with a charitable recipient; and
receiving a notification that the charitable asset and the matching charitable asset were transferred to the charitable recipient;
receiving, from the merchant device, based on the selection of the charitable activity, an offer associated with a promotion of one or more products to be purchased by a predetermined number of users during a predetermined time period at the merchant device;
sending, to a payment device associated with the merchant device, based on a utilization of a payment product at the merchant device, a payment authorization request for purchasing at least one product of the one or more products, wherein the payment authorization request comprises financial services information, description information, date information, and payment information associated with a user of the user device, wherein the payment authorization request further comprises a user identifier, a merchant identifier, a nonprofit identifier, a product identifier, and an account identifier, wherein the payment device authorizes the payment authorization request for purchasing the at least one product based on associating the payment product to an authorized account, wherein the payment device associates the payment product to the authorized account based on the user identifier, the merchant identifier, the nonprofit identifier, the product identifier, and the account identifier;

causing, based on the purchase of the at least one product during the predetermined time period by a number of users that does not exceed the predetermined number of users at the merchant device, a first portion of a purchase price of the at least one product to be allocated to a charitable recipient associated with the charitable activity, wherein the purchase device authorizes the allocation of the first portion of the purchase price to the charitable recipient based on verifying the user profile, wherein the first portion is matched by the preferred charitable entity;
causing, based on the purchase of the at least one product during the predetermined time period by the number of users that does not exceed the predetermined number of users at the merchant device, a second portion of the purchase price of the at least one product to be allocated to an account associated with the user device comprising a plurality of charitable assets, wherein the purchase device authorizes the allocation of the second portion of the purchase price to the account associated with the user device based on verifying the user profile;
sending, to the charitable transaction device, information associated with redemption of the offer, wherein the charitable transaction device stores the information associated with the redemption of the offer in the user profile; and
sending, by the user device, a routine contribution of a charitable asset to the charitable transaction device, wherein the routine contribution is withdrawn from a pay source associated with the user profile based on a frequency defined in the user profile, and wherein a portion of the routine contribution is sent to a preferred charitable entity of the one or more preferred charitable entities.

7. The method of claim 6, wherein the user interface comprises one or more of a graphical user interface (GUI) or a webpage.

8. The method of claim 6, wherein one or more of the charitable asset or the matching charitable asset comprise one or more of: a currency, a good, or a service.

9. The method of claim 6, further comprising, sending, based on the request to associate with the preferred charitable entity, a notification to the preferred charitable entity.

10. The method of claim 9, further comprising receiving, based on the request to associate with the preferred charitable entity, a notification of an association with the preferred charitable entity, wherein the notification comprises one or more of: an email, a text message, a social media post, or an application alert.

11. The method of claim 9, wherein the one or more preferred charitable entities comprise one or more of: a non-profit organization or a merchant.

12. The method of claim 6, wherein the notification that the charitable asset and the matching charitable asset were transferred to the charitable recipient comprises one or more of: an email, a text message, a social media post, or an application alert.

13. The method of claim 6, wherein the merchant device comprises one or more of a point of sale (POS) device, a gas pump terminal, or a credit card processing device.

14. A system comprising:
  a nonprofit device configured to send information associated with one or more charitable activities associated with one or more charitable entities;
  a merchant device comprising a payment device, wherein the merchant device is configured to send information associated with one or more charitable activities associated with one or more charitable interests;

a user device configured to:
send, via an application of the user device, an identifier associated with the user device and location information of the user device, wherein the identifier is associated with a user profile that indicates one or more charitable interests associated with a user of the user device;
receive, based on the identifier, a notification comprising information associated with one or more charitable activities associated with one or more preferred charitable entities of a plurality of preferred charitable entities, wherein the notification comprises an application alert via the application of the user device;
send, via a user interface of the application of the user device, a selection of a charitable activity of the one or more charitable activities associated with a preferred charitable entity of the one or more preferred charitable entities;
receive, based on the selection of the charitable activity, an offer associated with a promotion of one or more products to be purchased by a predetermined number of users during a predetermined time period at the merchant device;
send, to the payment device, based on a utilization of a payment product at the merchant device, a payment authorization request for purchasing at least one product of the one or more products, wherein the payment authorization request comprises financial services information, description information, date information, and payment information associated with a user of the user device, wherein the payment authorization request further comprises a user identifier, a merchant identifier, a nonprofit identifier, a product identifier, and an account identifier, wherein the payment device authorizes the payment authorization request for purchasing the at least one product based on associating the payment product to an authorized account, wherein the payment device associates the payment product to the authorized account based on the user identifier, the merchant identifier, the nonprofit identifier, the product identifier, and the account identifier;
cause, based on the purchase of the at least one product during the predetermined time period by a number of users that does not exceed the predetermined number of users at the merchant device, a first portion of a purchase price of the at least one product to be allocated to a charitable recipient associated with the charitable activity, wherein the purchase device authorizes the allocation of the first portion of the purchase price to the charitable recipient based on verifying the user profile, wherein the first portion is matched by the preferred charitable entity;
cause, based on the purchase of the at least one product during the predetermined time period by the number of users that does not exceed the predetermined number of users at the merchant device, a second portion of the purchase price of the at least one product to be allocated to an account associated with the user device comprising a plurality of charitable assets, wherein the purchase device authorizes the allocation of the second portion of the purchase price to the account associated with the user device based on verifying the user profile;
send information associated with redemption of the offer;
send a routine contribution of a charitable asset, wherein the routine contribution is withdrawn from a pay source associated with the user profile on a frequency defined in the user profile, and wherein a portion of the routine contribution is sent to a preferred charitable entity of the one or more preferred charitable entities;
receive, based on the charitable asset, a notification of a matching charitable asset associated with the preferred charitable entity, wherein the notification of the matching charitable asset associated with the preferred charitable entity comprises an application alert via the application of the user device;
send a request to associate the charitable asset and the matching charitable asset with a charitable recipient; and
receive a notification that the charitable asset and the matching charitable asset were transferred to the charitable recipient; and a charitable transaction device in communication with the nonprofit device, the merchant device, and the user device, wherein the charitable transaction device is configured to:
store the user profile in a database of the charitable transaction device;
receive the information associated with the one or more charitable activities associated with the one or more charitable interests from the merchant device;
receive the information associated with the one or more charitable activities associated with the one or more charitable entities from the nonprofit device;
distribute information associated with one or more charitable activities associated with one or more preferred charitable entities of a plurality of preferred charitable entities based on one or more user profiles, the information received from the nonprofit device, and one or more user device proximities;
determine, based on the identifier, an association with the one or more charitable interests indicated by the user profile;
determine, based on the location information, a proximity of the one or more preferred charitable entities to a current location of the user device;
determine, based on the one or more preferred charitable entities, the information associated with the one or more charitable activities;
send, to the user device, the information associated with the one or more charitable activities; and
send, based on the selection of the charitable activity of the one or more charitable activities, a request to associate with a preferred charitable entity of the one or more preferred charitable entities.

15. The system of claim 14, wherein the charitable transaction device is further configured to:
receive, based on a transaction associated with the charitable activity of the one or more charitable activities at the merchant device at a location of the preferred charitable entity of the one or more preferred charitable entities, the charitable asset from the user device and a matching charitable asset from the preferred charitable entity;
associate the charitable asset and the matching charitable asset with a charitable recipient of one or more charitable recipients; and send, to the charitable recipient, the charitable asset and the matching charitable asset.

16. System of claim 15, wherein one or more of the charitable asset or the matching charitable asset comprise one or more of: a currency, a good, or a service.

17. The system of claim 14, wherein the charitable transaction device configured to send the information associated with the one or more charitable activities is further configured to send one or more of: an email comprising the information associated with the one or more charitable activities, a text message comprising the information associated with the one or more charitable activities, a social media post comprising the information associated with the one or more charitable activities, or an application alert comprising the information associated with the one or more charitable activities.

18. The system of claim 14, wherein the user interface comprises one or more of a graphical user interface (GUI) or a webpage.

19. System of claim 14, wherein the charitable transaction device is further configured to:
   determine, based on the identifier of the user device, a user preference associated with the user device; and
   determine, based on the user preference, the plurality of preferred charitable entities.

20. The system of claim 14, wherein the plurality of preferred charitable entities comprise one or more of: a non-profit organization, a merchant, or another user device.

* * * * *